(12) United States Patent
Wang

(10) Patent No.: US 11,994,276 B2
(45) Date of Patent: May 28, 2024

(54) FOLDABLE PLANT LIGHT

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 17/878,426

(22) Filed: Aug. 1, 2022

(65) Prior Publication Data
US 2024/0035649 A1 Feb. 1, 2024

(51) Int. Cl.
*F21V 21/26* (2006.01)
*F21Y 115/10* (2016.01)

(52) U.S. Cl.
CPC ........... *F21V 21/26* (2013.01); *F21Y 2115/10* (2016.08)

(58) Field of Classification Search
CPC ................................. F21V 21/26; F21V 21/28
See application file for complete search history.

(56) References Cited

U.S. PATENT DOCUMENTS

| 4,078,169 A * | 3/1978 | Armstrong | F21V 7/005 |
| | | | 362/217.08 |
| 2020/0300447 A1* | 9/2020 | Luo | F21V 21/30 |
| 2021/0259158 A1* | 8/2021 | Ashdown | A01G 7/045 |

* cited by examiner

*Primary Examiner* — Karabi Guharay
(74) *Attorney, Agent, or Firm* — Daniel M. Cohn; Howard M. Cohn

(57) ABSTRACT

A foldable plant lamp comprises a pair of lamp holders which are hinged to each other. Each of the pair of lamp holders are provided with a pair of supporting elements. Each of the supporting elements are arranged opposite one another. First and second mounting components are LED light sources of the lamp holders. The first mounting components are connected between a first pair of the supporting elements and the second mounting components are connected between a second pair of the supporting components. Each of first and second pairs of supporting elements and the first and second mounting components are provided with wire passing grooves which communicate with each other. A surface of each of the mounting components is provided with a series of LED lights.

13 Claims, 3 Drawing Sheets

FOLDABLE PLANT LIGHT

TECHNICAL FIELD

The present invention belongs to the technical field of lamps and especially relates to a foldable plant light.

BACKGROUND OF THE INVENTION

The plant growth lamp is an artificial light source and is used for simulating sunlight required by plants to promote plant growth. The plant lamp is used in applications without natural light emission or where light supplement is needed. Most plant lights are used industrially, but are also used in home applications. The plant lamp industry is huge. The plant lamps presently available, occupy more space when used at home, and are inconvenient to use. One common problem with known plant lamps is the different size requirements. Moreover, the wires of the existing plant lamps are directly exposed on the surface of the plant lamp, so the user can easily suffer from an electric shock. Also, the lamps are not fully waterproofed, and the plant lamps are commonly unattractive.

SUMMARY OF THE INVENTION

According to the present invention, a foldable plant lamp comprises a pair of lamp holders which are hinged to each other. Each of the pair of lamp holders are provided with a pair of supporting elements. Each of the supporting elements are arranged opposite one another. First and second mounting components are LED light sources of the lamp holders. The first mounting components are connected between a first pair of the supporting elements and the second mounting components are connected between a second pair of the supporting components. Each of first and second pairs of supporting elements and the first and second mounting components are provided with wire passing grooves which communicate with each other. A surface of each of the mounting components is provided with a series of LED lights.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
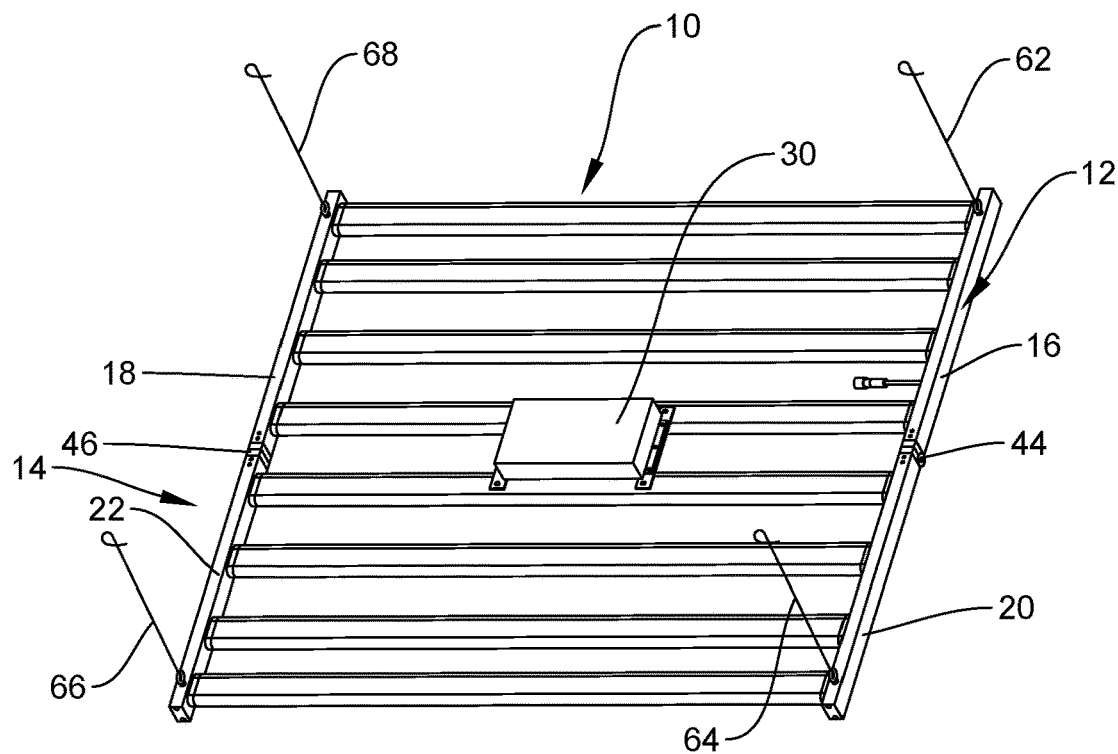

In some cases, similar elements may be referred to by similar numbers in various figures (FIGS.) of the drawing, in which case typically the last two significant digits may be the same, the most significant digit being the number of the drawing figure (FIG.). Furthermore, for clarity, some reference numbers may be omitted in certain drawings.

Figure 2:
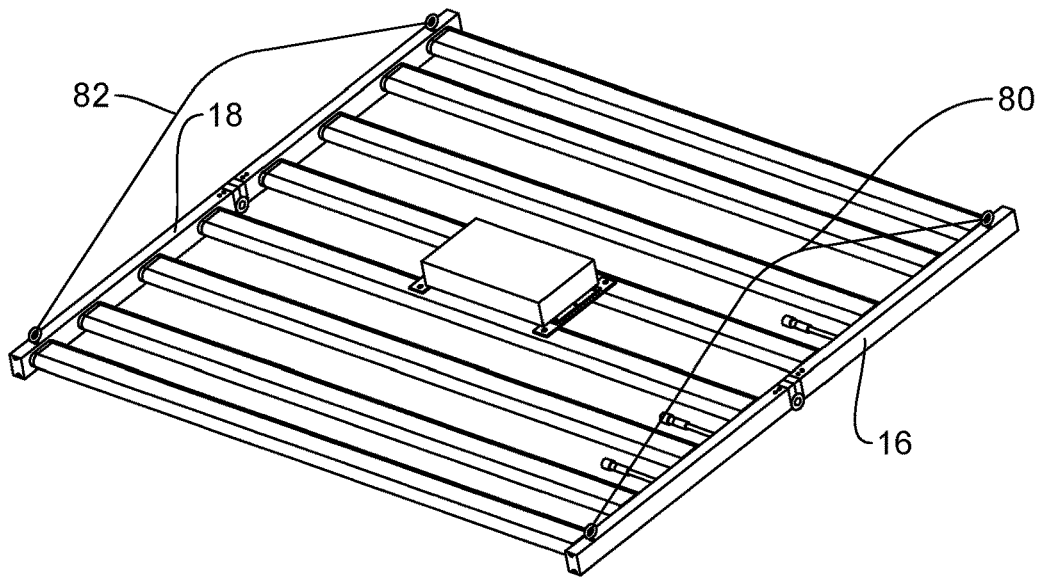
Figure 3:
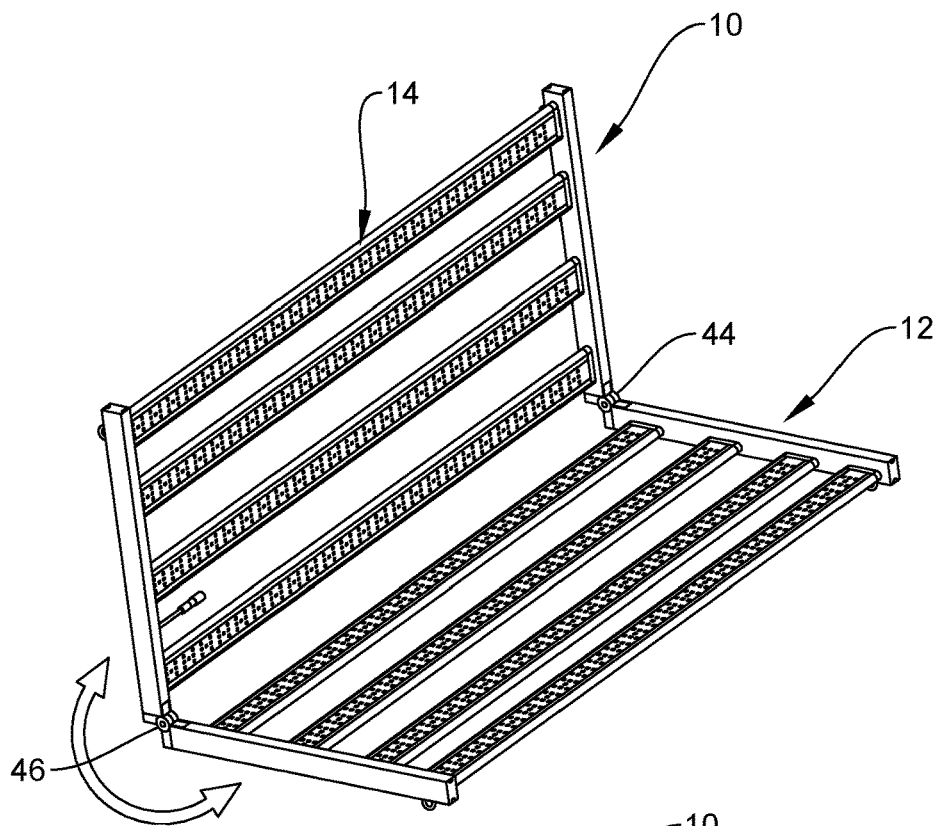
Figure 4:
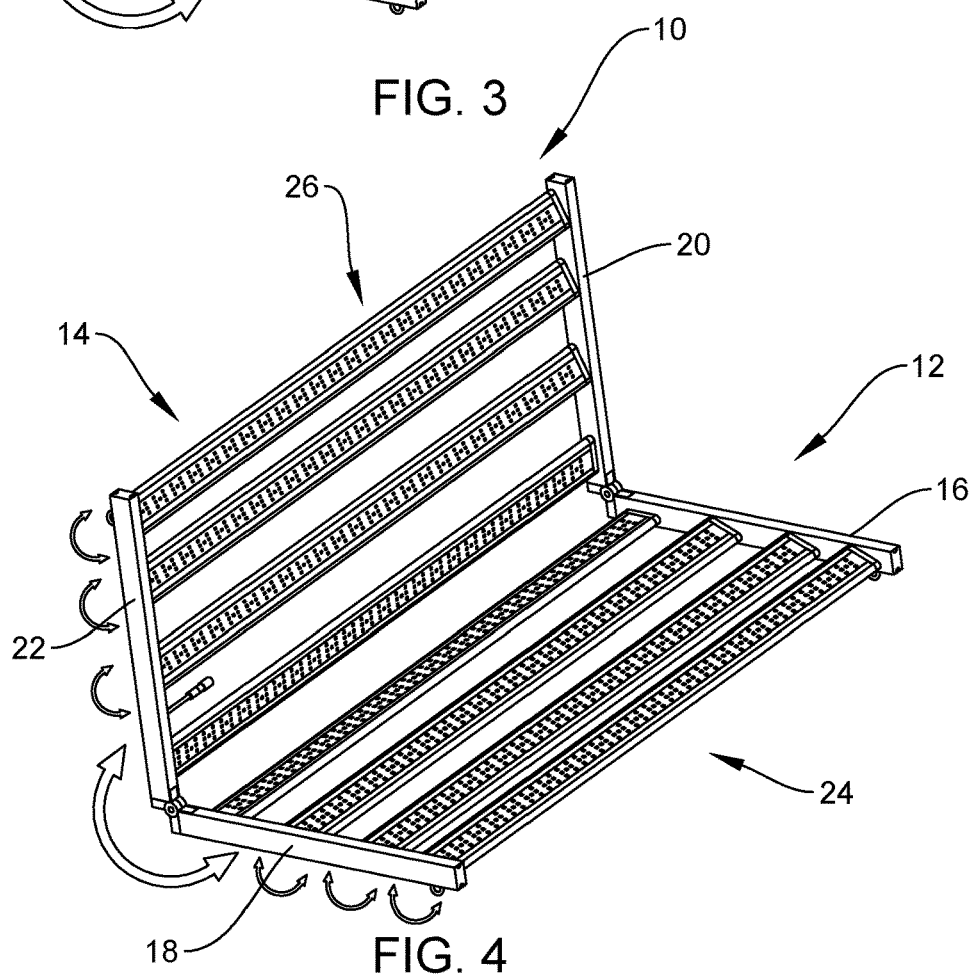
Figure 5:
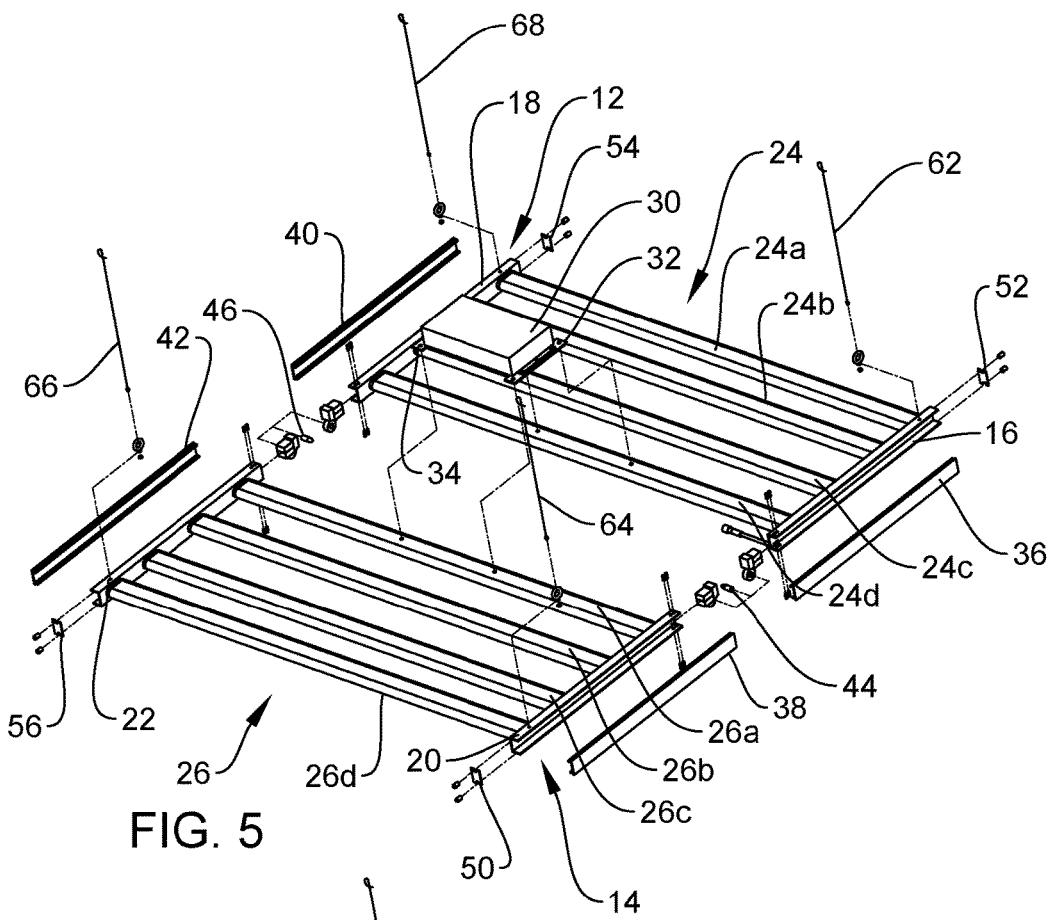
Figure 6:
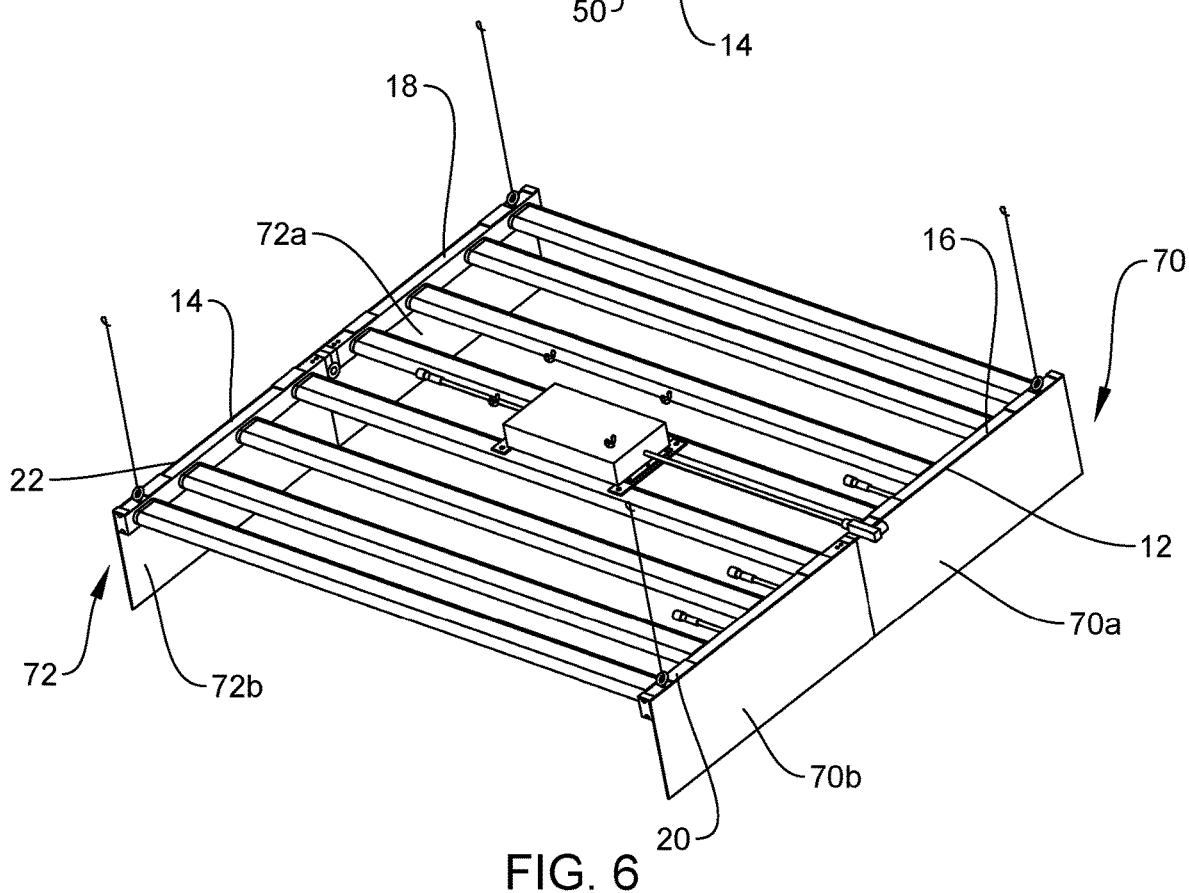

FIG. 1 is a top, three dimensional view of two interconnected lamp brackets of a foldable plant lamp, supported at each corner of the foldable plant lamp, according to the present invention;

FIG. 2 is a top, three dimensional view of two interconnected lamp brackets of a foldable plant lamp, supported by two wire rope components connected to opposite corners of the foldable plant lamp, according to the present invention;

FIG. 3 is a top, three dimensional view of two interconnected lamp brackets of a foldable plant lamp hinged to a partially extended position, according to the present invention;

FIG. 4 is a top, three dimensional view of two interconnected lamp brackets of a foldable plant lamp hinged to a partially extended position with the light sources rotated, according to the present invention;

FIG. 5 is an exploded, three dimensional top view of two lamp brackets of a foldable plant lamp prior to being interconnected, according to the present invention; and FIG. 6 is a top, three dimensional view of two interconnected lamp brackets of a foldable plant lamp with a reflective baffle installed on both sides of the foldable plant lamp, according to the present invention

DETAILED DESCRIPTION

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Referring to FIGS. 1-6, the present invention provides a foldable plant lamp 10, which includes a pair of lamp holders 12 and 14 which are hinged with each other. As seen in FIG. 5, each lamp holder 12 and 14 is provided with a pair of supporting elements 16 and 18 for lamp holder 12 and 20 and 22 for lamp holder 14. The supporting elements 16 and 18 of lamp holder 12 and 14 and supporting elements 20 and 22 of lamp holder 14 are arranged opposite one another. Mounting components 24 and 26 are LED light sources 24a, 24b, 24c, 24d (24a-24d) of lamp holder 12 and 26a, 26b, 26c, 26d (26a-26d) of lamp holder 14. The mounting components 24 are connected between the supporting elements 16 and 18 and mounting components 26 are connected between the supporting components 20 and 22. The supporting elements 16 and 18 and the mounting components 24 and 26 are respectively provided with wire passing grooves which communicate with each other One surface of the mounting components 24 and 26 are provided with a light source plate on which a series of LED lights are attached.

Each of the mounting components 24 and 26 are mounted to the supporting elements 16 and 18, respectively, and extend out of the u-shaped open ends of the supporting elements. Once the ends of the mounting components 24 and 26 are in place and the wires connected to the mounted to the mounting components 24 and 26 are located in the U-shaped channels, the wires can be connected as to power supply 30 which is mounted atop two of the mounting components such as 24b and 24c. The power supply 30 can be attached to the mounting components with mounting brackets 32 and 34 which extend on opposite sides of the power supply. The U-shaped channels can be enclosed with covers 36, 38, 40 and 42. The outer ends of the U-shaped channels can be enclosed with waterproof caps 50, 52, 54 and 56 as shown in FIG. 5.

As shown in FIG. 4, the mounting components 24 and 26 can be mounted to the supporting elements 16 and 18 and 20 and 22 so that they can rotate at an angle of 0 to 40 degrees. The degree of rotation provides flexible adjustment of the light output angle of the light so that plants can achieve the most efficient photosynthesis. Also, by rotating the mounting components 24 and 26, the optimal illumination can be achieved.

The foldable plant lamp 10 includes two or more lamp holders 12 and 14 that are hinged together by hinges 44 and 46 that can be mounted into the open ends of the U-shaped channels 16, 18, 20 and 22 of the supporting elements. The lamp holders 12 and 14 can be installed with hangers 60, 62, 64 and 66. This enables the distance between the lamps and the plants to be easily adjusted.

Referring to FIG. 6, there is illustrated reflective battles 70 and 72 which are mounted on both sides of the pair of lamp holders 12 and 14. The baffle 70 can include two elements 70a and 70b and the baffle 72 can include two elements 72a and 72b. The baffle 70 can be affixed to the mounting components 16 and 20 and the baffle 72 can be affixed to the mounting components 18 and 22, respectively. The use of the baffle 70 can include two elements 70a and 70b so that if the two lamp holders 12 and 14 are rotated as shown in FIG. 4, the two elements 70a and 70b each move with the lamp holders 12 and 14 to which they are attached.

Preferably, foldable plant lamp 10 can include means for adjusting luminance of the lamp holders 12 and 14. For example, a dimming module connected to the power source 30 can adjust the lamp holders to emit blue light in the 660-665 nm frequency range, white light in the 3000K frequency range, red light in the 5000K frequency range and infrared light in the 760 nm frequency range to meet the spectrum required by different plant growth.

The foldable plant lamp 10 can be installed by wire rope components 80 and 82 connected to the ends of supporting components 16 and 18 as shown in FIG. 2. The rope components 80 and 82 provide a convenient and quick means of adjusting the plant lamp 10 above a lamp shelf (not shown). Another means of installing a lamp 10 is with hooks mounted to the mounting components 24 and 26. The hooks can be moved to meet various specifications and sizes of the lamp 10.

It is to be understood that the above-described embodiments of the present invention are merely illustrative of or explaining the principles of the invention and are not to be construed as limiting the invention. Therefore, any modification, equivalent replacement, improvement and the like made without departing from the spirit and scope of the present invention should be included in the protection scope of the present invention. Farther, it is intended that the appended claims cover all such variations and modifications as fall within the scope and boundaries of the appended claims or the equivalents of such scope and boundaries.

The invention claimed is:

1. A foldable plant lamp, comprising:
a pair of lamp holders which are hinged to each other;
each of the pair of lamp holders being provided with a pair of supporting elements;
each of the supporting elements of each pair of the lamp holders arranged opposite one another;
first and second mounting components being LED light sources of the lamp holders;
the first mounting components being connected between a first pair of the supporting elements and the second mounting components being connected between a second pair of the supporting components;
each of first and second pairs of supporting elements and the first and second mounting components being provided with wire passing grooves which communicate with each other; and
a surface of each of the mounting components provided with a light source plate on which a series of LED lights are attached;
when the ends of the mounting components are in place, the wires connected to the mounting components are located in U-shaped channels;
wherein the wires can be connected as to a power supply;
wherein the power supply is attached to the mounting components with mounting brackets which extend on opposite sides of the power supply;
wherein the U-shaped channels are enclosed with covers;
wherein the outer ends of the U-shaped channels are enclosed with waterproof caps;
wherein first and second reflective baffles which are mounted to the first and second lamp holders respectively, and extend downward from the first and second pair of supporting elements on both sides of the pair of lamp holder; and
wherein each of the first and second reflective baffles includes two independent elements, each affixed to one of the supporting elements whereby the supporting elements can rotate at an angle of 0 to 40 degrees for optimal illumination of a plant beneath the foldable plant lamp.

2. The foldable plant lamp of claim 1 wherein each of the mounting components are mounted to the supporting elements, respectively, and extend out of u-shaped open ends of the supporting elements.

3. The foldable plant lamp of claim 2 wherein the power supply is mounted atop two of the mounting components.

4. The foldable plant lamp of claim 3 wherein the mounting components can be mounted to the supporting elements so that they can rotate at an angle of 0 to 40 degrees.

5. The foldable plant lamp of claim 4 wherein the degree of rotation of the mounting components provides flexible adjustment of the light output angle of the light so that plants being illuminated by the plant lamp can achieve the most efficient photosynthesis.

6. The foldable plant lamp of claim 5 wherein the degree of rotation of the mounting components provides optimal illumination of the plants being illuminated by the plant lamp.

7. The foldable plant lamp of claim 6 wherein the two or more lamp holders are hinged together by hinges mounted into open ends of the U-shaped channels of the supporting elements.

8. The foldable plant lamp of claim 7 wherein two or more lamp holders can be installed with hangers enable the distance between the lamp holders and plants being illuminated to be easily adjusted.

9. The foldable plant lamp of claim 8 including means for adjusting luminance of the lamp holders.

10. The foldable plant lamp of claim 9 wherein the means for adjusting luminance of the lamp holders is a dimming module connected to the power source.

11. The foldable plant lamp of claim 10 wherein the means for adjusting luminance of the lamp holders is a dimming module connected to the power source.

12. The foldable plant lamp of claim 11 wherein the dimming module connected to the power source for adjusting luminance of the lamp holders can adjust the lamp holders to emit blue light in the 660-665 nm frequency range, white light in the 3000K frequency range, red light in the 5000K frequency range and infrared light in the 760 nm frequency range to meet the spectrum required by different plant growth.

13. The foldable plant lamp of claim 12 wherein the lamp can be installed by wire rope components connected to the ends of supporting components.

* * * * *